United States Patent [19]
Collins

[11] Patent Number: 4,506,365
[45] Date of Patent: Mar. 19, 1985

[54] ERROR CORRECTION SYSTEM
[75] Inventor: Donald A. Collins, Easley, S.C.
[73] Assignee: NCR Corporation, Dayton, Ohio
[21] Appl. No.: 443,835
[22] Filed: Nov. 22, 1982
[51] Int. Cl.³ ............................................. G06F 11/10
[52] U.S. Cl. ..................................................... 371/38
[58] Field of Search ...................... 371/21, 37, 38, 51, 371/53; 365/200, 201

[56] References Cited
U.S. PATENT DOCUMENTS

| | | | |
|---|---|---|---|
| 3,573,728 | 4/1971 | Kolonkowsk et al. | 371/38 |
| 3,794,819 | 2/1974 | Berding | 371/38 |
| 3,982,226 | 9/1976 | Bunker et al. | 371/38 |
| 4,105,999 | 8/1978 | Nakamura | 371/37 |
| 4,317,201 | 2/1982 | Sedalis | 371/38 |
| 4,319,356 | 3/1982 | Kocol et al. | 371/38 |
| 4,320,511 | 3/1982 | Koga et al. | 371/37 |
| 4,336,611 | 6/1982 | Bernhardt et al. | 371/38 |
| 4,384,353 | 5/1983 | Varshney | 371/38 |
| 4,404,673 | 9/1983 | Yamanouchi | 371/38 |

OTHER PUBLICATIONS

Lewin, Theory and Design of Digital Computer Systems, 1980, p. 348.
Peterson & Weldon, Error-Correcting Codes, 2nd edition 1972, MIT Press, pp. 357–373.

Primary Examiner—Jerry Smith
Assistant Examiner—Mark Ungerman
Attorney, Agent, or Firm—J. T. Cavender; Wilbert Hawk, Jr.; Richard W. Lavin

[57] ABSTRACT

A method and apparatus for correcting single bit errors in data stored in a first memory includes a dynamic shift register for dividing data by a polynomial during the time the data is being written into the first memory resulting in the generation of a remainder which is stored in a second memory. When reading the data from the first memory, the data is again divided by the same polynomial. The remainder generated by the second division is compared with the remainder stored in the second memory. If the remainders do not match, indicating an error was introduced into the data during storage or retrieval of the data in the first memory, the remainder stored in the second memory is shifted into the dynamic shift register and followed by the shifting of a number of zero bits into the shift register which is equal to the maximum number of bits in the data located in the second memory. As each zero bit is shifted into the shift register, a bit counter is incremented and the output bit of each stage of the shift register is examined. When the output of all the stages in the shift register except the last stage is zero and the last stage contains a binary bit one, the count of the bit counter points to the bit location in the data stored in the second memory locating the bit that is in error.

4 Claims, 13 Drawing Figures

ERROR CORRECTION SYSTEM

CROSS-REFERENCE TO RELATED APPLICATIONS

Error Detecting System, co-pending application Ser. No. 443,809, filed on even date herewith, invented by Donald A. Collins, Jr., and Thomas B. O'Hanlan, and assigned to the NCR Corporation.

BACKGROUND OF THE INVENTION

The present invention is directed to an error correction system and more particularly to a single bit error correction system for correcting an error bit found in a data word stored in a semiconductor memory device. In modern day processing systems, semiconductor memory devices such as dynamic random access memory have been utilized. Due to the inherent capacitance structure of such memory devices, errors are introduced into the data stored therein. In order to overcome this deficiency in the use of RAM memory devices, error coding techniques have been employed. Some of these techniques include the use of error correction codes contained in each data word stored in the memory device or systems which implement the well-known Hamming code (see "Error Detection and Error Correcting Codes" by R. W. Hamming, Bell Systems Technical Journal, Vol. 26, No. 2, April 1950, pp. 147-160) or other similar codes. Such systems employ redundant data which involves complex networks and large memory storage areas. It is therefore a principal object of this invention to provide a system for correcting single bit errors which require a minimum amount of storage area. It is another object of this invention to provide an error correction system which is simple in construction and low in cost.

SUMMARY OF THE INVENTION

These and other objects of this invention are fulfilled by providing a multi-stage shift register which is constructed to divide a data word being written into a dynamic RAM memory unit by a polynomial. The remainder generated by the division of the data word by the polynomial is stored in a static RAM memory unit. When the same data word is read out of the dynamic RAM memory unit, by the processor, the word is stored in the static RAM memory unit and again divided by the polynomial. The remainder generated as a result of the second division is compared with the remainder stored in the static RAM memory unit to determine if an error has occurred in storing the data word in the dynamic RAM memory unit. If the remainders do not match, indicating an error in the data word read out of the dynamic RAM memory device, the remainder stored in the static RAM memory unit is loaded into the shift register followed by a predetermined number of zero bits. Each time a zero bit is loaded into the shift register, the output of each stage of the shift register is examined and a count of the zero bits being loaded in the shift register is generated. The error bit in the data word is detected when the output of the last stage of the shift register is a binary bit one and the remaining stages each have an output of a binary bit zero. The location of the error bit in the data word stored in the static RAM is pointed to by the count occurring at this time, which is then complemented correcting the error bit.

BRIEF DESCRIPTION OF THE DRAWING

The foregoing and various other objects, advantages and meritorious features of the present invention will be apparent from the following description and appended claims when read in conjunction with the drawings, wherein like numerals identify corresponding elements;

DESCRIPTION OF THE PREFERRED EMBODIMENT

Figure 1A:
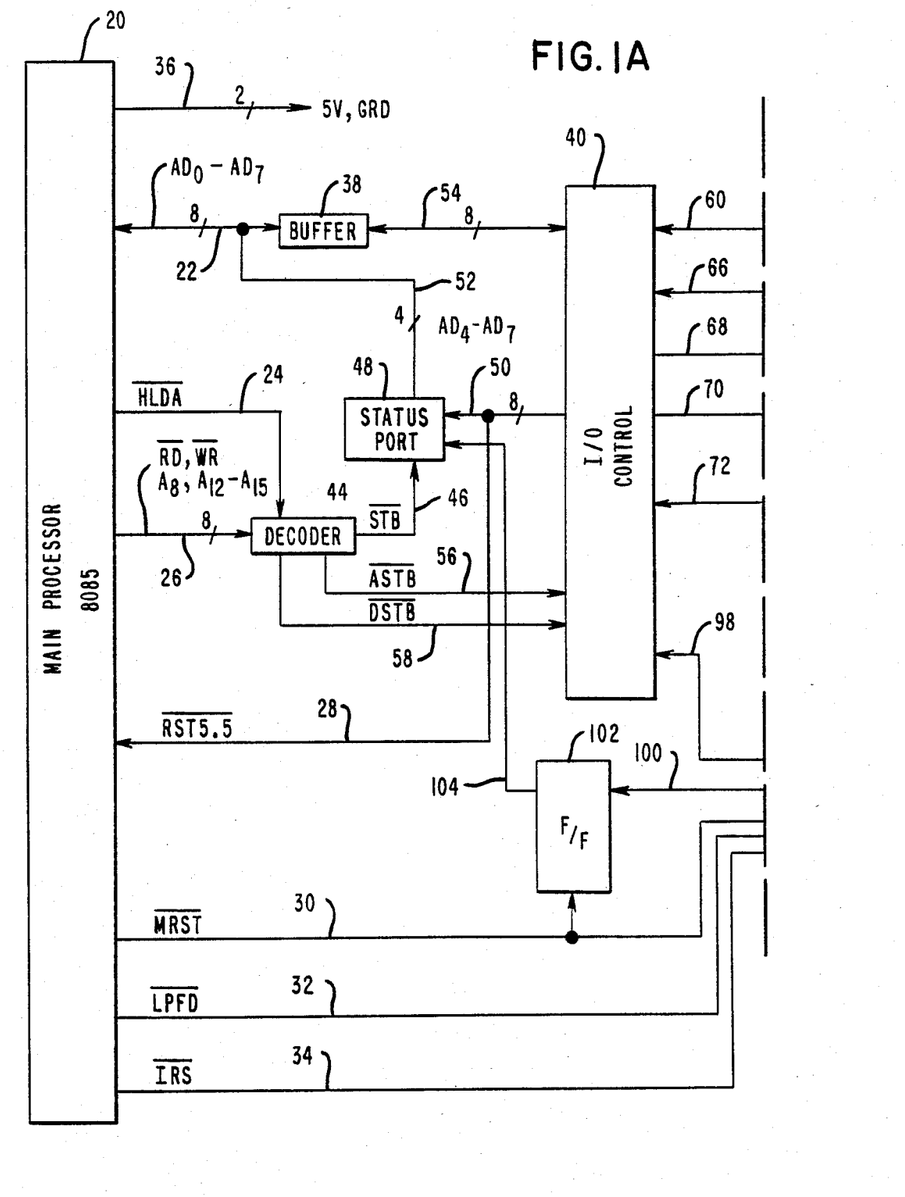
FIGS. 1A and 1B taken together define a block diagram of a portion of the data processing system in which is located the present invention.
Figure 1B:
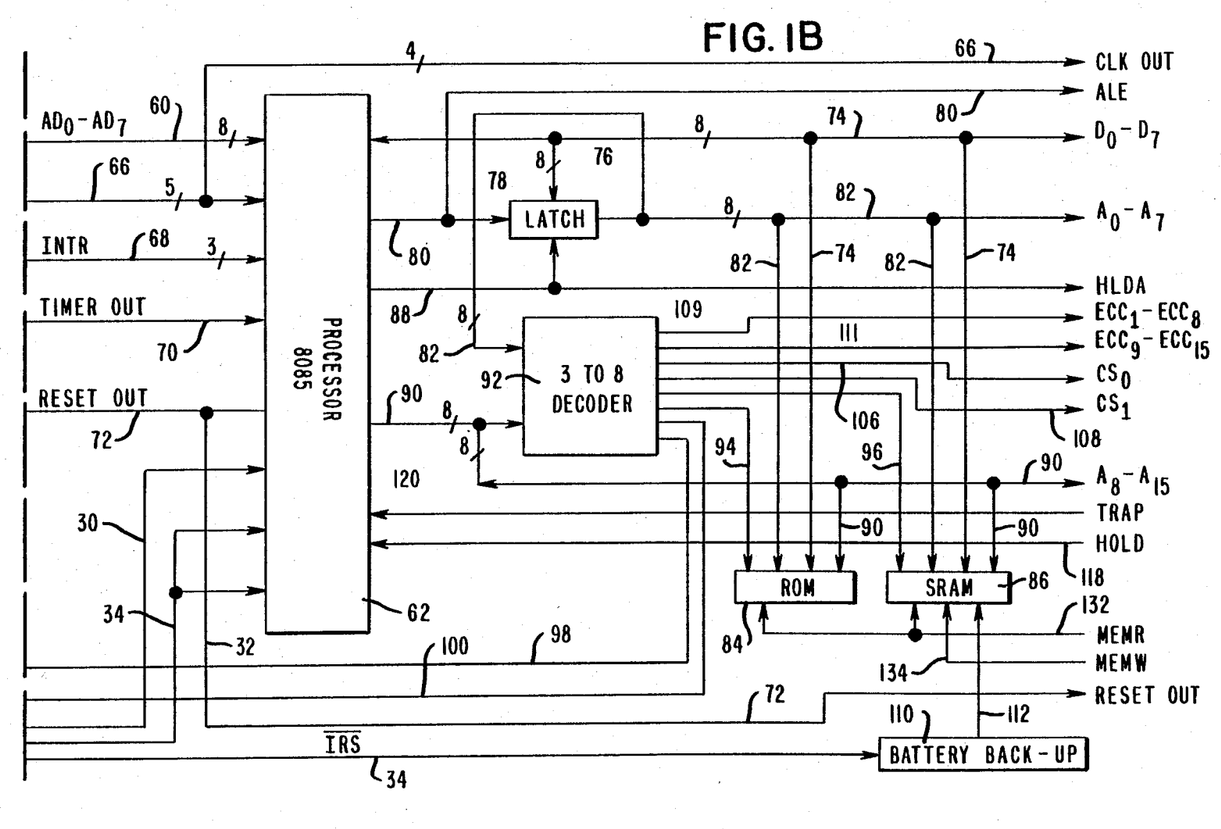

Referring now to FIGS. 1A, 1B, 2A and 2B, there is disclosed a block diagram of the data processing system which incorporates the present invention. The data processing system includes a main processor board and an auxiliary memory board which includes a dynamic random access memory (DRAM) unit for increasing the memory capacity of the main processor board. The main processor board includes a main processor 20 (FIG. 1A) which communicates with the auxiliary memory board over a number of bus lines and control lines in a manner that is well-known in the art. The main processor 20 may consist of an Intel 8085 microprocessor which includes internal registers, counters, pointers and associated logic circuits well-known in the art. The processor 20 outputs and receives over a bi-directional 8-bit bus 22 the low level Address-Data bits $AD_0$–$AD_7$ inclusive; outputs over line 24 the active low Hold Acknowledge control signal $\overline{HLDA}$; outputs over the 8-bit bus 26 the Read and Write control signals $\overline{RD}$, $\overline{WR}$ respectively and the high order Address signals $A_8$, $A_{12}$–$A_{15}$ inclusive; receives over the input line 28 the Restart signal $\overline{RST5.5}$; outputs over line 30 the Master Reset signal $\overline{MRST}$, outputs over line 32 the Low Power Fail Detect signal $\overline{LPFD}$; outputs over line 34 the Internal Reset signal $\overline{IRS}$ and outputs over the 2-bit bus 36 the 5 volt Power Supply signal and the ground connection GRD. The data bits appearing on the bus 22 are stored in a 74LS373 buffer 38 prior to transfer to either the main processor 20 or to an Intel 8155 I/O controller unit 40 which controls the orderly flow of the data bits between the main processor 20 and an Intel 8085 memory processor unit 62 (FIG. 1B). The control signals appearing on the bus 26 are inputted into a 74LS138 decoder 44 which in response to receiving the signals stated above outputs the Status Strobe signal $\overline{STB}$ over line 46 to a 74LS367 bus driver 48 functioning as a status port unit which also receives over the 8-bit bus 50 the high order Address-Data signals $AD_4$–$AD_7$ inclusive from the I/O controller 40, which signals are then transmitted over the 4-bit bus 52 to the 8-bit bi-directional bus 22 connected between the buffer 38 and the main processor 20 under the control of the strobe signal $\overline{STB}$. The decoder 44 also outputs over line 56 the Receive Status Strobe signal $\overline{ASTB}$ to the controller 40 and over line 58 the Write Status Strobe signal $\overline{DSTB}$, which signals strobe the data signals out of the controller 40.

Figure 2A:
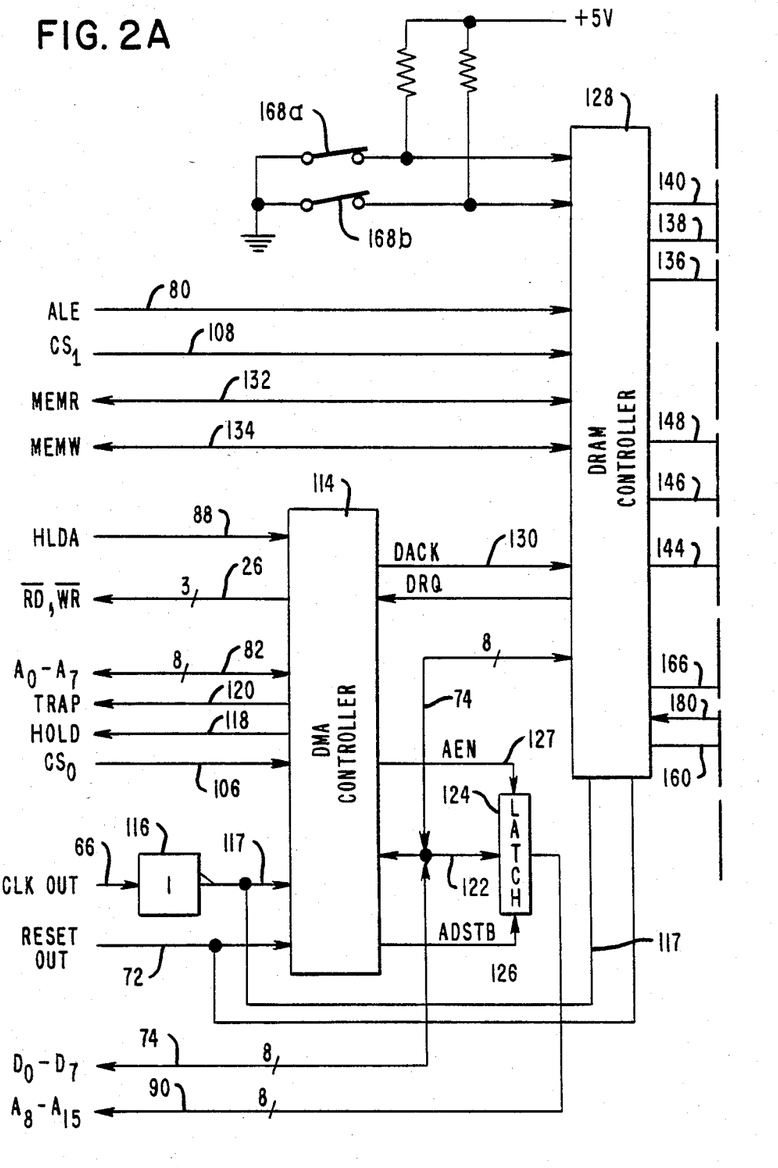
FIGS. 2A and 2B taken together define a block diagram of the remaining portion of the data processing system in which is located the present invention.
Figure 2B:
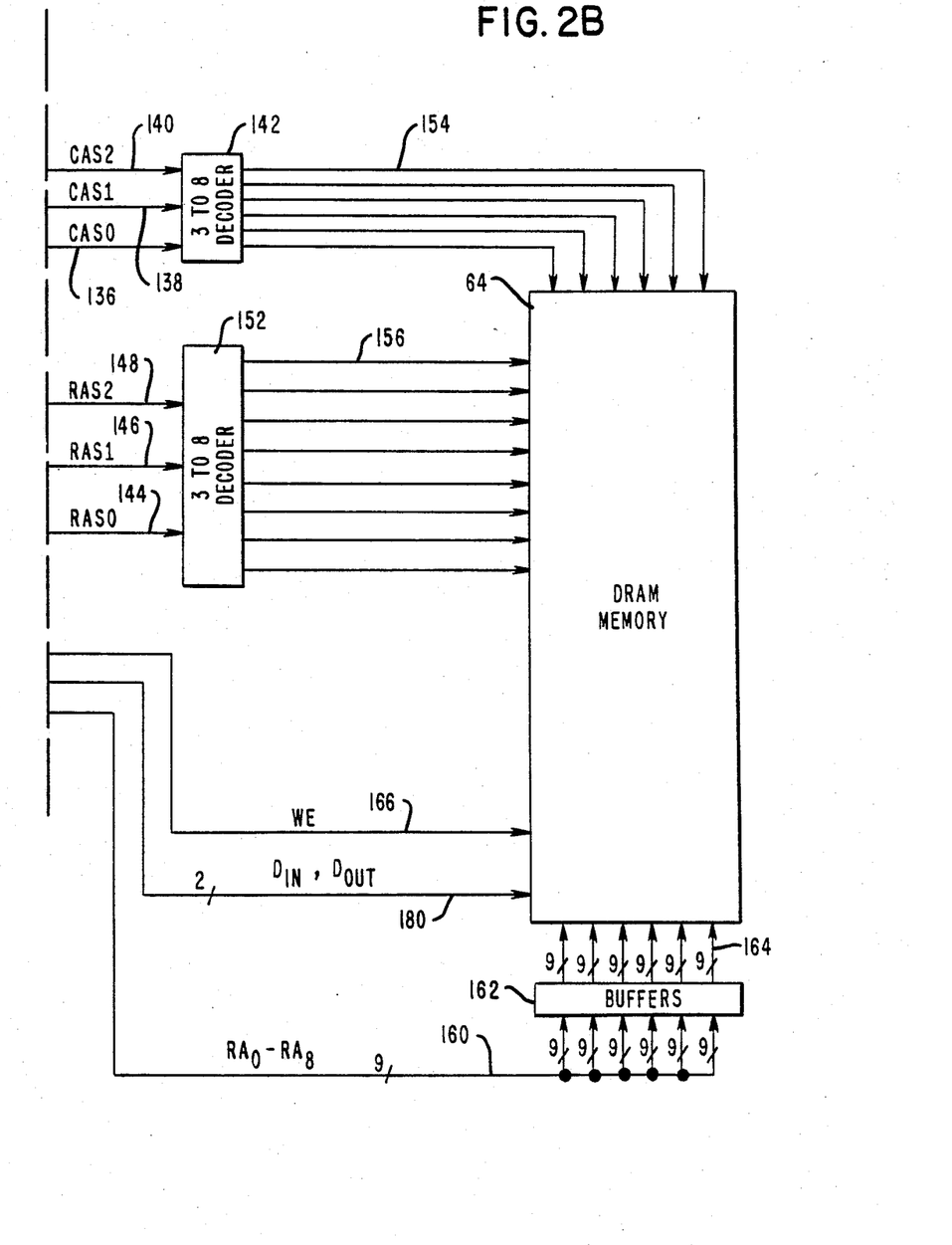

The I/O controller 40 outputs the Address-Data signals $AD_0$–$AD_7$ inclusive over the 8-bit bi-directional bus 60 (FIGS. 1A and 1B) to the memory processor 62 which controls the transfer of data between the main processor 20 (FIG. 1A) and an auxiliary dynamic random access memory (DRAM) unit 64 (FIG. 2B). Other signals transmitted between the I/O controller 40 and the memory processor 62 include the Clock Out signal CLK OUT, the Read and Write signals $\overline{RD}$, $\overline{WR}$, the Address Latch Enable signal ALE, and the I/O Memory Write signal $\overline{I/O/M}$. These signals are transmitted between the I/O controller 40 and the processor unit 62 over the 5-bit bi-directional bus 66. Appearing on the 3-bit bus 68 is the Interrupt signal INTR while the Timing signals TIMER OUT appears on line 70 and the Reset signal RESET OUT appears on line 72. All of these signals control the transfer of the data bits between the I/O controller 40 (FIG. 1A) and the memory processor 62 in a manner that is wellknown in the art.

As shown in FIG. 1B, the memory processor unit 62 will transmit/receive the data bits $D_0$–$D_7$ inclusive over the bi-directional bus 74 and the low order address bits $A_0$–$A_7$ inclusive over the 8-bit bidirectional bus 76 to a latch member 78 which, upon the Latch Enable signal ALE appearing on line 80 becoming active, will output the address signals $A_0$–$A_7$ inclusive over the 8-bit bus 82. These signals are transmitted to a ROM memory unit 84 (FIG. 1B) and a static RAM (SRAM) memory unit 86 in which the address bits are used in addressing data locations in the memory units 84 and 86. The SRAM memory unit 86 includes a first storage portion for storing the data words being transferred between the processor 62 and the memory 64, a second storage portion for storing an error correction code for each of the data words stored in the memory unit 84 in a manner that will be described more fully hereinafter and a third storage portion for storing a bit count, this latter storage portion functioning as a zero bit counter. The data bits $D_0$–$D_7$ are stored in the first storage portion prior to a write operation of the memory unit 64 (FIG. 2B). During a read operation, the data bits read from the memory unit 64 are stored in the third storage portion of the memory unit 86 prior to transfer over bus 74 to the processor unit 62.

Appearing on the output line 88 of the memory processor unit 62 is the Hold Acknowledge signal HLDA while the high order address bits $A_8$–$A_{15}$ inclusive appear on the 8-bit bi-directional bus 90 for transmission to a SN74LS138 three to eight decoder unit 92 and also to the ROM memory unit 84 and the SRAM memory unit 86 for addressing data locations in the memory. The decoder 92 which receives the low order address bits $A_0$–$A_7$ inclusive over the bus 82 will also output memory enabling signals over lines 94 and 96 to the memory units 84 and 86 respectively. The decoder 92 will also output an enabling signal over line 98 to the I/O controller 40 (FIG. 1A) and over line 100 to a flip-flop 102 (FIG. 1A) which outputs an enabling signal over line 104 to the status port unit 48 enabling its operation. The flip-flop 102 is reset by the Master Reset signal $\overline{MRST}$ appearing on line 30. The decoder 92 (FIG. 1B) further outputs the Chip Select signals $CS_0$ and $CS_1$ on lines 106 and 108 respectively which are used in addressing the DRAM memory unit 64 (FIG. 2B) in a manner that is well-known in the art. The decoder 92 further outputs Error Correction Clock signals $ECC_1$–$ECC_8$ inclusive over line 109 and $ECC_9$–$ECC_{15}$ inclusive over line 111 which are used in enabling the reading of signals representing the remainder of a division operation generated during the transfer of data bits between the DRAM memory unit 64 and the SRAM memory unit 86 as will be described more fully hereinafter. Further included in the data processing system is a battery back-up unit 110 (FIG. 1B) which supplies power over line 112 to the SRAM memory unit 86 in case of a power failure in the system.

Referring now to FIGS. 2A and 2B, which illustrate in block form the remaining portion of the data processing system incorporating the present invention, there is shown a direct memory access (DMA) controller 114 used in transferring data between the memory processor unit 62 (FIG. 1B) and the DRAM memory unit 64 (FIG. 2B). The DMA controller 114 receives the Hold Acknowledge signal HLDA over line 88 (FIG. 1B) enabling the controller to transfer data bits from the DRAM memory unit 64 to the SRAM memory unit 86 and then to the memory processor unit 62 (FIG. 1B) which then in turn transfers the data bits to the main processor 20. The controller 114 further outputs the low order Address bits $A_0$–$A_7$ inclusive over the 8-bit bi-directional bus 82 and receives the Chip Select signal $CS_0$ over line 106, the clock signals CLK OUT which are transmitted over the 4-bit bus 66 and inverted by the inverters 116 before being received by the controller 114 over bus 117 and the reset signal RESET OUT over line 72. In response to receiving the signal HOLD, the 8085 memory processor 62 will output the signal HLDA over line 88 to the DMA controller 114 (FIG. 1B) notifying the DMA controller of the completion of the transfer of the data bits from the DRAM memory unit 64. The raising of the Interrupt signal TRAP over line 120 notifies the memory processor 62 of the starting or stopping of a data transfer operation by the DMA controller 114.

The DMA controller 114 further outputs in a multiplex arrangement the data and address signals required in accessing the DRAM memory unit 64 over an 8-bit bi-directional bus 122 in which the high order address bits $A_8$–$A_{15}$ inclusive are stored in a latch 124 (FIG. 2A) under the control of the Address Strobe signal ADSTB appearing on line 126. The address bits are then outputted over the 8-bit bus 90 for use in addressing the storage locations in the DRAM memory unit 64 (FIG. 2B) and the SRAM memory unit 86 upon the generation of the Address Enable signal AEN which appears on line 127. The data signals $D_0$–$D_7$ inclusive appearing on the 8-bit bi-directional bus 74 are transmitted during a write operation of the DRAM memory unit 64 from the SRAM memory unit 86 (FIG. 1B) to a DRAM controller 128 (FIG. 2A) whose construction will be described more fully hereinafter.

After the data bits $D_0$–$D_7$ inclusive appear on the bi-directional bus 74 during a read or write operation, the DMA controller 114 outputs the Acknowledge signal DACK over line 130 to the DRAM controller 128. As will be explained more fully hereinafter, the DRAM controller 128 during a write operation generates an error correction code word for each data word being written into the DRAM memory unit 64. This error correction code word is then stored in the second storage portion of the SRAM memory unit 86 (FIG. 1B). When the same data word is again read from the DRAM memory unit 64, a second error correction code word is generated which, if no error is present in the data word being read from the DRAM memory unit 64, will be the same as the first error correction code word. This construction allows the data words which do not contain error correction code bytes to be stored in the DRAM memory unit 64, thereby allowing more data words to be stored in the DRAM memory unit.

During a data transfer operation, the memory processor 62 (FIG. 1B) transmits the sector address signals over the data bus 74 and strobes these signals into the DRAM controller 128 with the Chip Select signals $CS_1$ appearing on line 108 (FIG. 2A). The DRAM controller 128 outputs the Memory Read control signals MEMR over line 132 and the Memory Write control signal MEMW over line 134 for transferring data between the SRAM memory unit 86 (FIG. 1B) and the DRAM memory unit 64 (FIG. 2B). The controller 128 further outputs the Column Refresh signals CAS-0–CAS2 inclusive over lines 136–140 inclusive to a SN74LS138 three to eight decoder 142 (FIG. 2B) and the Row Refresh control signals RAS0–RAS2 over lines 144–148 inclusive to a second SN74LS138 three to eight decoder 152. The decoders 142 and 152 output the appropriate column and row refresh signals over lines 154 and 156 to the DRAM memory unit 64 for refreshing the cells in the dynamic memory unit in a manner that is well-known in the art.

The data signals $D_{IN}$, $D_{OUT}$ stored in the memory unit 64 are serially transmitted over the 2-bit bus 180 to the DRAM controller 128. The address signals $RA_0$–$RA_8$ inclusive, used in addressing the storage sectors of the memory unit 64 during a read or write operation, are transmitted in parallel over the 9-bit bus 160 to a buffer unit 162 for storage therein which in turn is connected to the memory unit 64 over the 9-bit buses 164 (FIG. 2B). The DRAM memory unit 64 is provided with up to 128 64K dynamic RAM chips or 128 256K×1 dynamic RAM chips providing a memory capacity of 4 megabytes. When addressing the memory unit 64, the signal WE is transmitted from the controller 128 over line 166 for enabling the access operation of the memory unit 64 to occur. During the initialization of the system, the switches 168a and 168b (FIG. 2A) notify the controller 128 of the system configuration.

Figure 3:
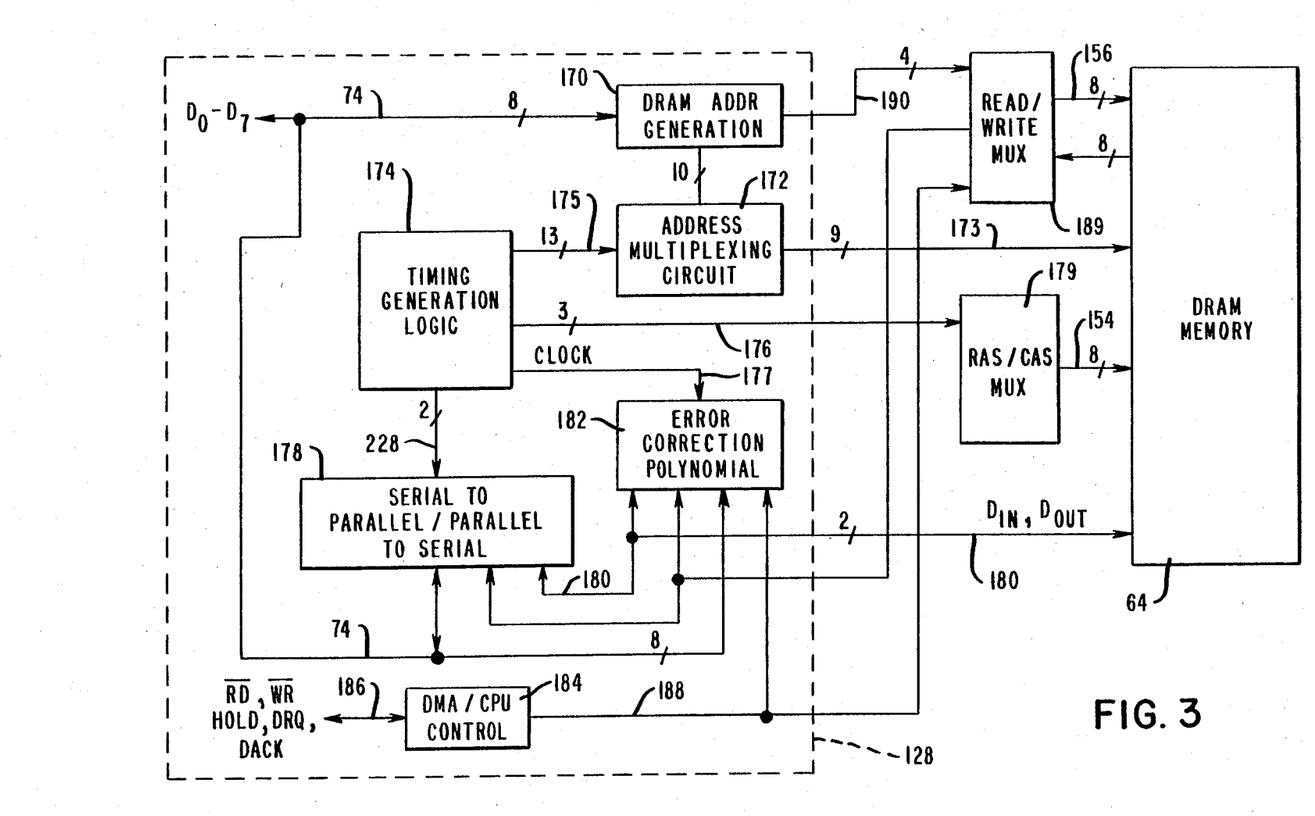
FIG. 3 is a block diagram of the dynamic RAM controller showing its relationship to the dynamic RAM main memory unit.

Referring now to FIG. 3, there is shown in dotted outline a block diagram of the DRAM controller 128 (FIG. 2A) which includes a DRAM address generator 170 which receives over the 8-bit bi-directional bus 74 the address bits used for addressing the storage sectors of the DRAM memory unit 64 during a read or write operation. The address bits appearing on the bus 74 are multiplexed by an address multiplexing circuit 172 under the timing control of thirteen timing signals generated by a timing generation logic unit 174 and transmitted over the 13-bit bus 175. The logic unit 174 also outputs timing signals over a 3-bit bus 176 to a refresh multiplexer 179, comprising the three to eight decoder 142 (FIG. 2B), and a Clock signal CLOCK over line 177 to an error correction polynomial unit 182. The multiplexed address signals are transmitted by the multiplexing circuit 172 over a 9-bit bus 173 to the DRAM memory unit 64. The data signals appearing on the 8-bit bus 74 are also transmitted to a serial-to-parallel/parallel-to-serial converter 178 which converts the data from parallel to serial when the data is being written into the memory 64 and from serial-to-parallel when the data is read from the memory 64. The serial data signals are outputted from the converter 178 over line 180 to an error correction polynomial unit 182 which divides the serial data signals appearing on line 180 by a polynomial to generate a remainder comprising the error correction code word in a manner to be described more fully hereinafter. The serial data signals $D_{IN}$, $D_{OUT}$ are also transmitted over line 180 to the memory unit 64 during a write operation and are outputted over line 180 during a read operation.

Further included in the DRAM controller unit 128 is a control unit 184 which receives over bus 186 the control signals $\overline{WR}$, $\overline{RD}$, HOLD and will output the Acknowledge signal DACK over the same bus. In response to receiving these control signals, the control unit 184 will output the appropriate control signals over line 188 for controlling the transfer of the address signals between the read/write multiplexer 189, comprising the three to eight decoder 152 (FIG. 2B), and the memory unit 64. The decoder 152 receives over a 4-bit bus 190 a portion of the address signals for use in addressing the memory unit 64. During the time the memory unit 64 is being accessed, the decoders 142 and 152 output the column and row refresh signals CAS, RAS over the 8-bit buses 154 and 156 to the memory unit 64 enabling the cells in the memory unit to be refreshed.

Figure 4A:
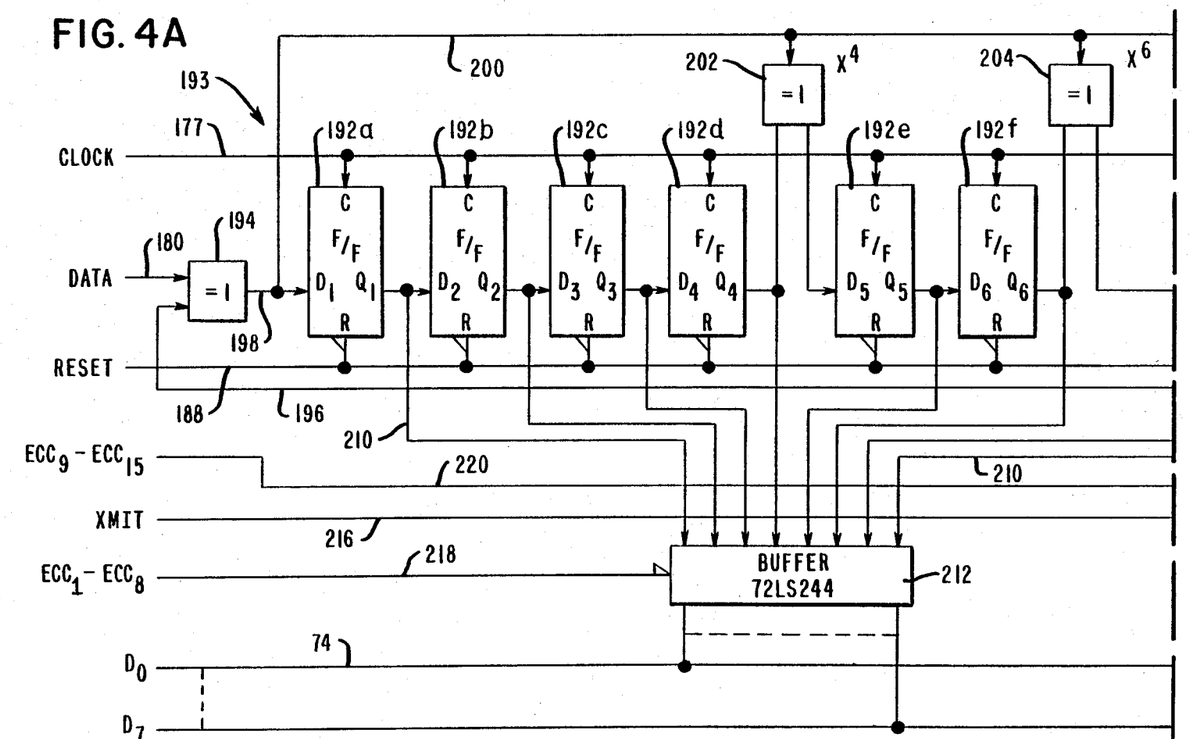
FIGS. 4A and 4B taken together disclose the logic circuit of the error correction polynomial block of the dynamic RAM controller of FIG. 3.
Figure 4B:
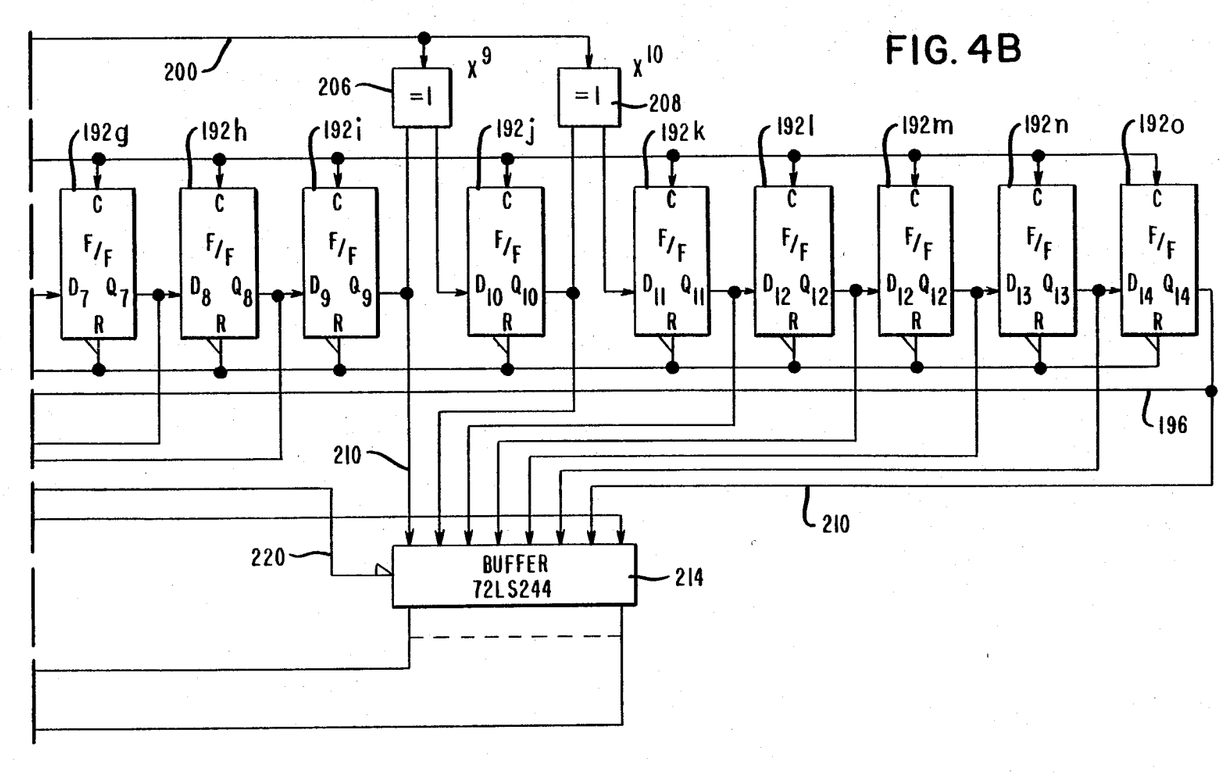

Referring now to FIGS. 4A and 4B, there is shown details of the error correction polynomial unit 182 (FIG. 3) which includes a plurality of 74LS74 flip-flops 192a–192o inclusive forming a dynamic shift register generally indicated by the numeral 193 (FIG. 4A). As disclosed on page 360 of the publication "Error Correction Codes" by W. W. Wesley Peterson and E. J. Weldon, Jr., MIT Press, 1972, the method for deriving the polynomial for a 256 byte word length is described in corollary 11.2. Utilizing the irreducible polynomial of degree 9 from the Tables found on page 476 of the reference, we derive the following equation:

$$g(x) = (x^9 + x^4 + 1)(x^6 + 1)$$

which gives $$g(x) = x^{15} + x^{10} + x^9 + x^4 + 1. \tag{1}$$

To find the maximum number of binary bits that can pass through the polynomial and still correct a one bit error in a bit length series of 9 is found by the following equation.

$$n^{max} = 6(x^9 - 1).$$

If x is equal to 2, then $n_{max}$ is equal to 3066.

Subtracting the term 15 which is equal to the number of flip-flop stages in the polynomial logic unit 182 from the above figure, we find that n is equal to 3051.

Since the actual bit length word of the memory unit 64 is 256 bytes or 2048 bits, the error correction code is shortened by the insertion of a number of zeros into the polynomial unit 182 which is equal to the difference between the actual bit length of the word stored in the memory unit 64 and the maximum number of bits that can be corrected. In the present example, this difference is 1003.

The data being inputted into the polynomial unit 182 appears on line 180 (FIGS. 3 and 4A) and is inputted into one input of an Exclusive OR gate 194 which also receives at its other input the output signal of the last 74LS74 flip-flop 192o (FIG. 4B) of the shift register 193 appearing on the feedback line 196. The Exclusive OR gate 194 will complement the binary input signal appearing on line 180 if the binary signal on line 196 is a 1. The output signal of the Exclusive OR gate 194 will output a signal over line 198 to the D input of the first flip-flop 192a of the shift register 193 and also over line 200 to the input of each of a number of Exclusive OR gates 202–208 inclusive. By examining FIGS. 4A and 4B, it will be seen that the Exclusive OR gate 194 receiving the output of the flip-flop 192o will correspond to the term $x^{15}$ in the polynomial equation (1) disclosed previously. In a similar manner, the Exclusive OR gate 202 corresponds to the term $x^4$, the gate 204 to the term $x^6$, the gate 206 to the term $x^9$ and the gate 208 to the term $x^{10}$. As the binary data bits appearing on line 180 are shifted through the flip-flops 190a–192o inclusive under the control of the clock signals CLOCK appearing on line 177 (FIGS. 3 and 4A), the Exclusive OR gates 194 and 202–208 inclusive will perform successive additions in modulo 2 arithmetic of the binary bits resulting in the binary bit word being divided by the polynomial, thereby producing a multi-bit remainder appearing on the Q output lines 210 of the flip-flops 192a–192o inclusive and at the input of a pair of 74LS244 tri-state buffer units 212 (FIG. 4A) and 214 (FIG. 4B). At the conclusion of the operation of the polynomial unit 182, the error correction code clock signals $ECC_{1-8}$ inclusive appearing on line 109 and the clock signals $ECC_{9-15}$ inclusive appearing on line 111 will enable the data bits appearing on the input lines 210 of the buffer units 212 and 214 to be transmitted over the 8-bit bus 74 for storage in the SRAM memory unit 86 (FIG. 1B) for use in an error detecting procedure as will be described more fully hereinafter.

Figure 5:
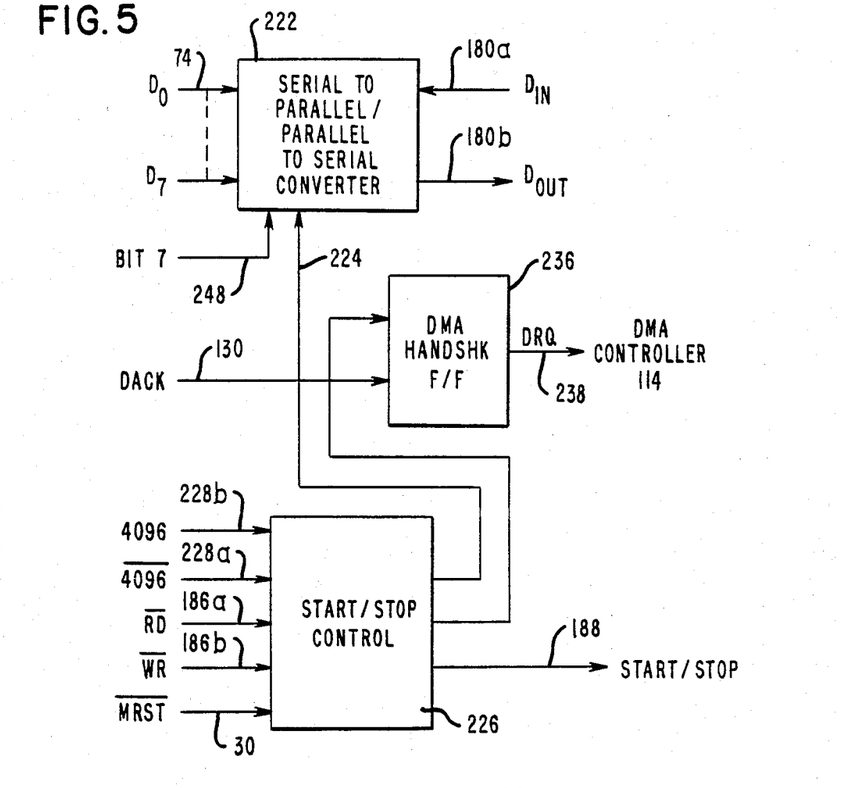
FIG. 5 is a block diagram of the circuits which control access to the dynamic RAM memory unit by the dynamic RAM controller.

Referring now to FIG. 5, there is disclosed the logic circuit of the serial-to-parallel/parallel-to-serial converter unit 178 located in the DRAM controller 128 (FIG. 3) which includes a 74LS199 converter 222 receiving the data bits $D_0$–$D_7$ appearing on bus 74 and the serial data bits appearing on lines 180a and 180b of the bus 180 (FIG. 2B). The converter 222 will convert the binary bits to the proper sequence between the parallel bus 74 and the serial lines 180a and 180b under the control of signals appearing on line 224 and generated by a Start/Stop control unit 226 located in the DMA/CPU control unit 184 (FIG. 3) in response to the control unit 226 receiving the clock signals 4096, $\overline{4096}$ over the lines 228b and 228a of the bus 228 from the timing generation logic unit 174 (FIG. 3) and the read and write control signals $\overline{RD}$, $\overline{WR}$ appearing on lines 186a and 186b of the bus 186. The control unit 226 controls the transfer of data bits between the DRAM memory unit 64 (FIG. 2B) and the DMA controller unit 114 (FIG. 2A). As disclosed in FIG. 7, upon the 4096 clock signals 230 going high, the DMA request (DREQ) signal 232 will go high enabling data to be transferred over bus 74 between the SRAM memory unit 86 and the converter 178 (FIG. 3). For every data byte transferred, the DMA controller 114 will raise the DMA acknowledge (DACK) signal 234 (FIG. 7) over line 130 (FIG. 2A) of the bus 186 to a DMA handshake 74LS74 flip-flop 236 (FIG. 5) which resets the flip-flop resulting in the lowering of the DREQ signal 232 appearing on line 238. When the 4096 clock signal 230 goes low (FIG. 7), the control unit 226 will lower the transfer/refresh enable signal 240 over line 188 resulting in the completion of a DRAM memory access operation and the start of a refresh operation of the DRAM memory unit 64. Upon the raising of the next 4096 clock signal by the timing generation logic unit 174 (FIG. 3), the DREQ signal 232 is again raised allowing for the transfer of data from the next sector to occur. The read and write signals $\overline{RD}$ and $\overline{WR}$ appearing on lines 186a and 186b respectively identify the type of memory access operation that is occurring in a manner that is well-known in the art.

Figure 6:
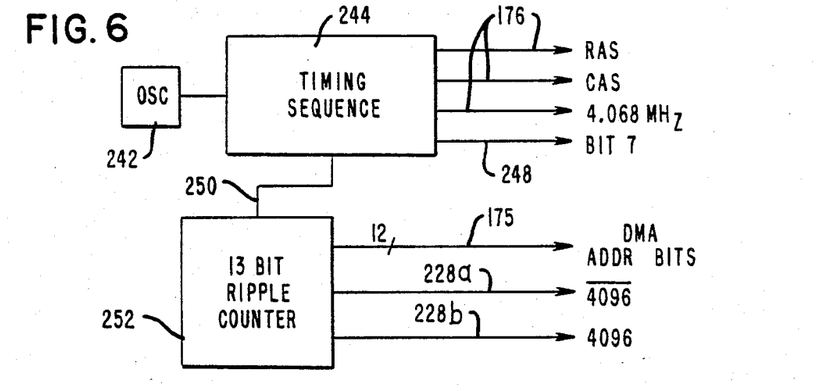
FIG. 6 is a block diagram of the timing generation logic circuit block of the dynamic RAM controller.

Referring now to FIG. 6, there is shown a block diagram of the timing generation logic unit 174 located in the DRAM controller 128 (FIG. 3), which includes an oscillator 242 outputting the system clock signals of 4.068 MHz. to a timing sequence unit 244 comprising a plurality of flip-flops wired in series for outputting the strobe signals RAS and CAS and the 4.068 MHz. system clock signals over the bus lines 176 to the multiplexer 189 (FIG. 3) enabling the high address signals $A_9$–$A_{15}$ to be strobed into the DRAM memory unit 64. The sequence unit 244 also outputs the 7-bit clock signal 246 (FIG. 7) over line 248 to the converter 222 (FIG. 5) controlling the transfer of an 8-bit data word appearing on the bus 74 into the converter 222. The 4.068 MHz. system clock signals are also transmitted over line 250 to a 13-bit ripple counter 252 which outputs a count of 0–4096 over the 12-bit bus 175 to the address multiplexing circuit 172 (FIG. 3) which outputs the signals over bus 173 as the row address signals in the DRAM memory unit 64. The counter 252 will also output the 4096, $\overline{4096}$ clock signals (FIG. 7) over lines 228b and 228a, respectively, to the start/stop control unit 226 (FIG. 5) for initiating either an access operation or a refresh operation, the latter occurring at the time the clock signal $\overline{4096}$ occurs.

Figure 7:
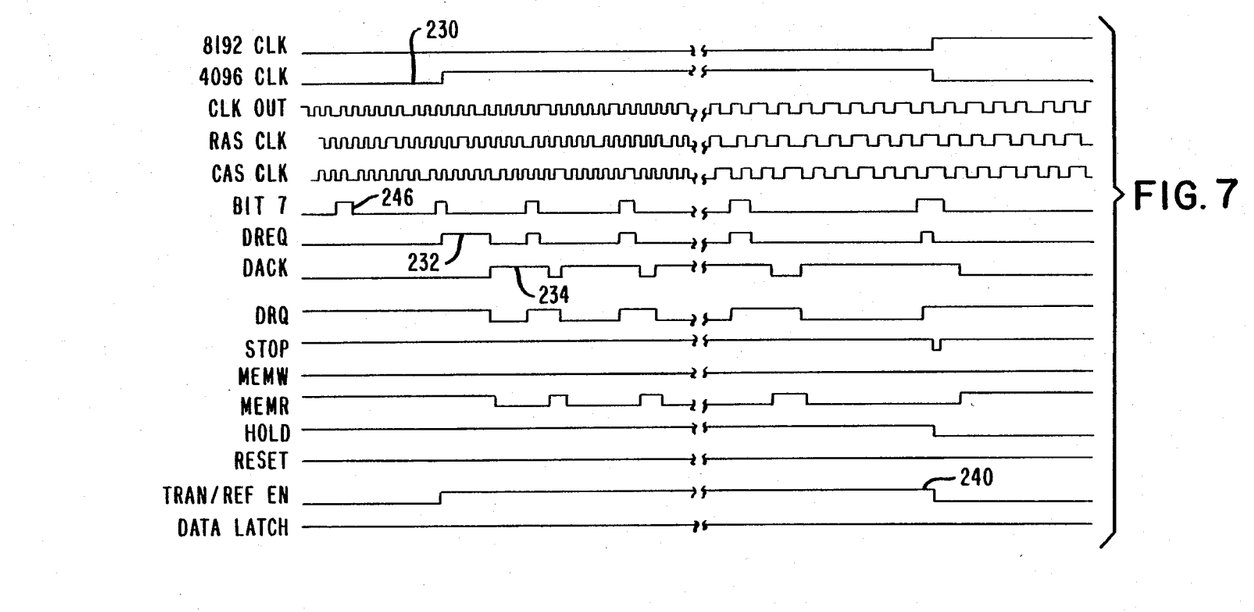
FIG. 7 is a schematic representation of the timing signals used in transferring data between the dynamic RAM memory unit and the DMA controller.
Figure 8:
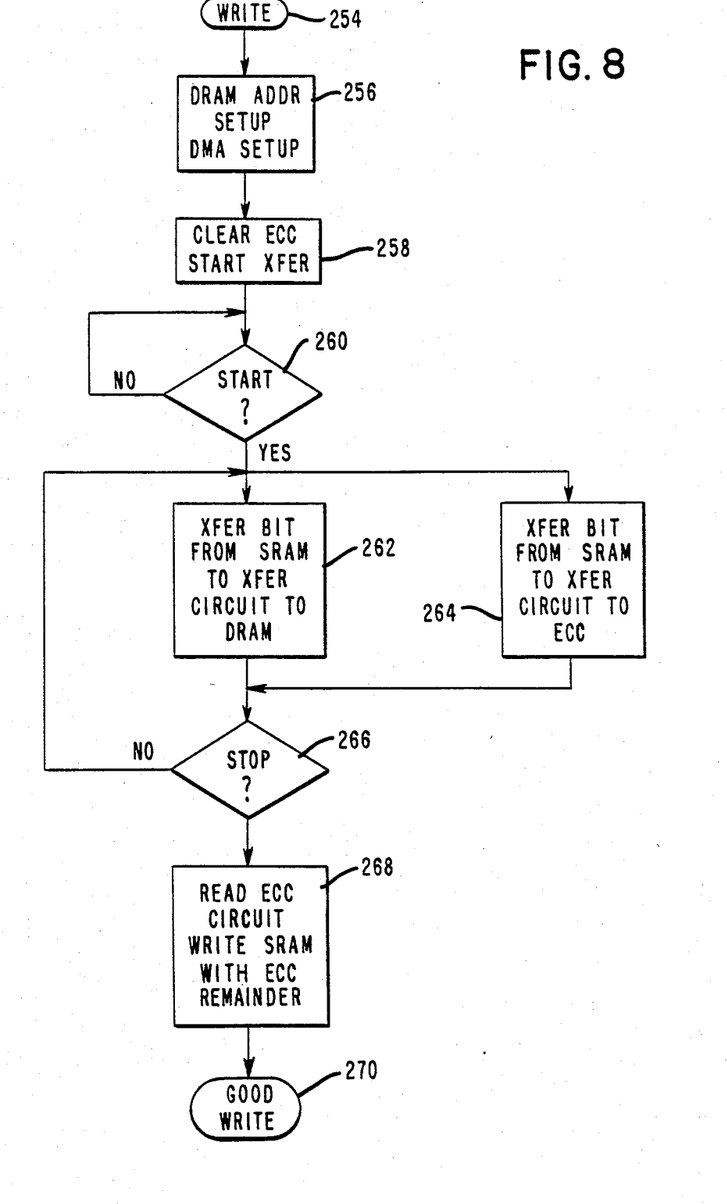
FIG. 8 is a flowchart of a write operation of the present invention.

Referring now to FIG. 8, there is shown a flowchart of a write operation of the data processing system. The processor 62 (FIG. 1B) will initiate a write operation (block 254) by loading (block 256) the address bits $A_0$–$A_{15}$ into the DRAM controller 128 (FIG. 2A) and set up the DMA controller 114 for a write operation by loading the addresses of the data bits stored in the first storage portion of the SRAM memory unit 86 (FIG. 1B) which are to be transferred to the DRAM memory unit, reset (block 258) the flip-flops 192a–192o inclusive (FIGS. 4A and 4B) of the polynomial logic unit 182 (FIG. 3) and start (block 260) transferring the data bits from the SRAM memory unit 86 (FIG. 1B) to the serial-to-parallel converter unit 178 (FIG. 3) upon the appearance of the high 4096 clock signals 230 (FIG. 7). The data bits are then stored in the DRAM memory unit 64 (block 262). The data is also transferred (block 264) from the converter unit 178 to the error correction polynomial unit 182 (FIG. 3) where a 15 bit remainder representing an error correction code is generated. After all the data bits have been stored in the memory unit 64 and have been transferred to the polynomial logic unit 182 (block 268), the processor will enable the buffers 212, 214 (FIGS. 4A and 4B) to output the remainder of the polynomial unit operation for storage in the second storage portion of the SRAM memory unit 86 at the same address as the data is stored in the DRAM memory unit 64, thereby completing a valid write operation (block 270).

Figure 9:
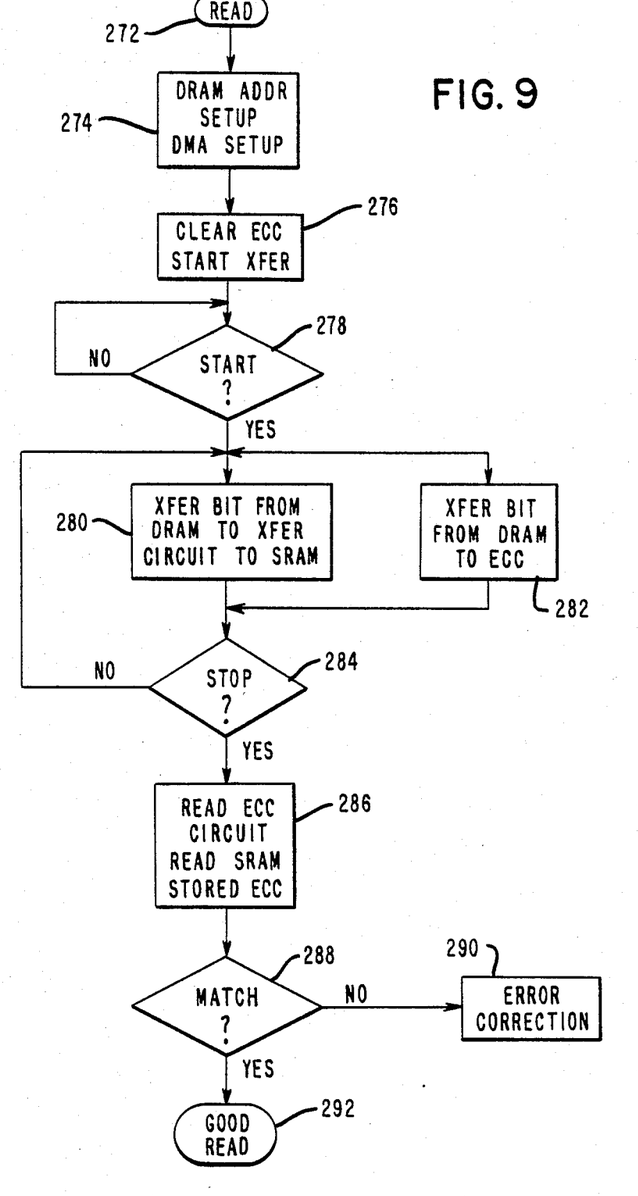
FIG. 9 is a flowchart of a read operation of the present invention.

In reading the same data from the DRAM memory unit 64 (block 272) (FIG. 9), the processor 62 (FIG. 1B) will again load the address bits of the data to be read (block 274) into the DRAM controller unit 128 (FIG. 2A) and set up the DMA controller 114 for a read operation, reset (block 276) the flip-flops 192a–192o inclusive (FIGS. 4A and 4B) of the polynomial unit 182 (FIG. 3) and wait (block 278) for the appearance of a high 4096 clock signal 230 (FIG. 7) before transferring the serial data bits from the DRAM memory unit 64 to the serial-to-parallel converter unit 178 (FIG. 3) which transfers the parallel data bits to the first storage portion of the SRAM memory unit 86 (block 280). The data bits are also transferred from the memory unit 64 to the polynomial unit 182 (block 282) where a remainder is generated by the operation of the polynomial unit. At the completion of the transfer of the data bits (block 284), the processor will read the remainder present at the output of the buffer units 212, 214, (FIGS. 4A and 4B) and the remainder stored in the second storage portion of the SRAM memory unit 86 at the same address as the data bits read from the DRAM memory unit 64 (block 286) and compare the two remainders (block 288). If the two remainders are the same, the memory processor unit 62 interrupts the main processor unit 20 indicating the presence of data stored in the buffer 38 (FIG. 1A) (block 292) which is to be transferred to the main processor unit. If the remainders do not match, indicating an error in the data read from the memory unit 64, an error correction operation occurs (block 290) correcting the error if it is limited to a single bit error.

Figure 10:
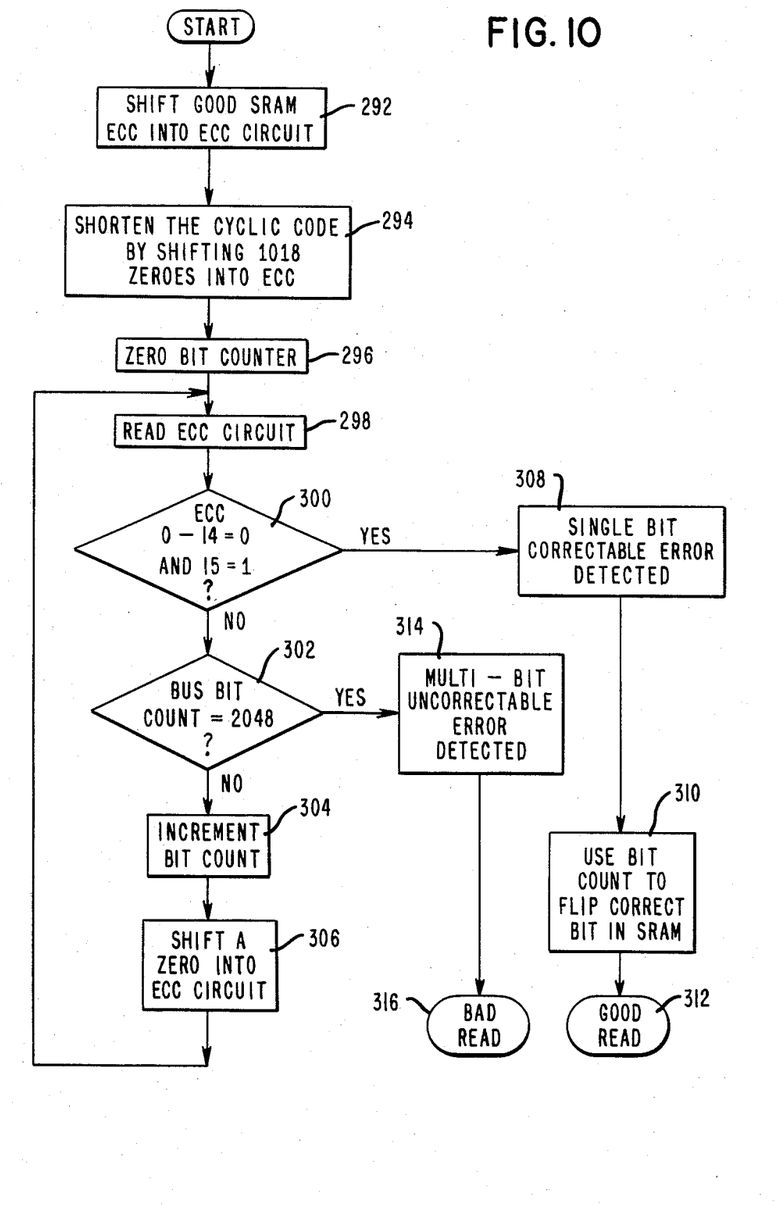
FIG. 10 is a flowchart of an error correction operation of the present invention.

Referring now to FIG. 10, there is shown a flowchart of an error correction operation. After the processor 62 (FIG. 1B) senses that the error correction codes generated by the error correction polynomial unit 182 (FIG. 3) do not match, the processor 62 will shift (block 292) the original 15 bit error correction code stored in the SRAM memory unit 86 (FIG. 1B) into the polynomial unit 182. After shifting the error correction code into the polynomial unit 182, the processor 62 will shorten (block 294) the cyclic code operation of the polynomial unit 182 by shifting 1,003 binary zero bits into the polynomial unit after which the processor will start shifting a second string of zero bits into the polynomial unit 182. Prior to this operation, the processor 62 resets the count stored on the third storage portion of the memory unit 86 representing the bit counter portion of the SRAM memory unit 86 (FIG. 1B). Upon shifting the first zero bit of the second string into the polynomial unit 182, the processor will store (block 296) a count in the third portion of the SRAM memory unit 86. After shifting in the first zero bit, the processor 62 will read (block 298) the output signals of the flip-flops 192a–192o (FIGS. 4A and 4B) by enabling the buffers 212, 214 to output the signals over bus 74 to the processor 62. If the output signal of the flip-flop 192o (FIG. 4B) is not a binary bit one (block 300), it will check (block 302) the count stored in the bit counter portion of the SRAM memory unit 86. If the count is not equal to 2,048 representing the maximum bit length of a data word that can be stored in the memory unit 64, the processor will increment (block 304) the count in the bit counter portion of the memory unit 86 and shift (block 306) another zero bit into the polynomial unit 182. This process will be repeated until the output signals of the polynomial unit 182 comprise a sequence of binary bit zeros in the first 14 flip-flops 190a–190n inclusive and a binary bit one in the 15th flip-flop 190o, indicating the detection (block 308) of an error bit whose bit location in the data word stored in the SRAM memory unit 86, is pointed to by the count residing in the bit counter portion of the SRAM memory unit. The processor will then complement (block 310) the error bit of the data word stored in the SRAM memory unit 86 correcting the error bit and generating a signal indicating a good read operation (block 312).

If after inserting 2,048 zero bits in the polynomial unit 182 the processor has not found the required sequence of signals in the polynomial unit (block 300) and finding the bit count to be equal to 2,048 (block 302), the processor 62 will recognize (block 314) the presence of a multi-bit uncorrectable error condition and generate a signal indicating a bad read operation (block 316).

It will be seen from this construction that a single error bit is corrected as part of a read operation of the dynamic RAM memory unit 64 which utilizes a simple dynamic shift register constructed to divide the word being read from the memory by a polynomial. This arrangement requires a small area of the SRAM memory unit 86 to be utilized for storage of a count representing the number of zero bits shifted into the polynomial unit 182.

The Intel integrated circuits referenced in this application are commercially available from the Intel Corporation of Santa Clara, Calif. while the remaining circuit references are commercially available from the Texas Instruments Corporation of Dallas, Tex.

Numerous modifications and adaptions of the system of the present invention will be apparent to those skilled in the art and thus it is intended by the appended claims to cover all such modifications and adaptions which fall within the true spirit and scope of this invention.

I claim:

1. In a computer memory system which includes a large dynamic random access memory, a small static random access memory, a multi-stage shift register constructed to divide a multi-bit data word stored in the large dynamic memory by a polynomial to generate a first error correction code for storage in the small static memory when the data word is stored in the large memory and a second error correction code when the same data word is read from the large memory and processing means for comparing the first and second error correction code to detect the presence of an error bit in the data word, a method for correcting an error in a multi-bit data word comprising the steps of:

shifting the first error correction code from the small static random access memory into the multi-stage shift register;

shifting a plurality of zero bits into the shift register;

counting the number of zero bits shifted into the shift register;

sensing the output of each of the stages of the shift register as each zero bit is shifted into the shift register;

generating a first signal indicating the detection of a single bit correctable error when the last stage of the shift register outputs a first binary signal and the remaining stages of the shift register each outputs a second binary signal, said first signal indicating the presence of an error bit in the data word whose location corresponds to the number of zeros shifted into the shift register at the time the first signal is generated; and correcting the error bit in the data word by complementing the signal level of the error bit.

2. The method of claim 1 in which the step of generating a first signal occurs when the last stage of the shift register outputs a binary bit one and the remaining stages of the shift register each outputs a binary bit zero.

3. The method of claim 2 which further includes the step of generating a second signal indicating the detection of a multi-bit uncorrectable error when the count of zeros shifted into the shift register is equal to the maximum bit width of the data word.

4. The method of claim 3 in which the correcting step further includes the step of correcting the error bit in the data word stored in the static memory unit having a bit position equal to the count occurring at the time said first signal is generated.

* * * * *